United States Patent [19]
Osann, Jr.

[11] 4,079,251
[45] Mar. 14, 1978

[54] INCREMENTAL OPTICAL ENCODER SYSTEM FOR ABSOLUTE POSITION MEASUREMENT

[76] Inventor: Robert Osann, Jr., 918 Vermont St., Oakland, Calif. 94610

[21] Appl. No.: 713,854

[22] Filed: Aug. 12, 1976

[51] Int. Cl.$^2$ .............................................. G01D 5/34
[52] U.S. Cl. ........................... 250/231 SE; 250/237 G
[58] Field of Search ............ 250/221, 231 R, 231 SE, 250/237 R, 237 G; 324/175; 356/169, 170; 340/347 P

[56] References Cited

U.S. PATENT DOCUMENTS

| | | | |
|---|---|---|---|
| 3,534,360 | 10/1970 | Hafle | 250/231 SE |
| 3,654,480 | 4/1972 | Stephenson | 324/175 |
| 3,999,064 | 12/1976 | Kramer | 340/347 P |

Primary Examiner—David C. Nelms

[57] ABSTRACT

An absolute encoding system is provided based on an incremental optical encoder which, together with a low power circuit technology and means for pulsing the light emitter(s) of the encoder (normally the largest power consuming device(s) in such a system) with a signal of low duty cycle and means for sampling the light detector outputs during the appropriate period of response to the emitted light pulses, produces an encoder system having extremely low internal power consumption allowing not only data retention but also data acquisition during periods of isolation from an external power supply by relying on its own relatively small battery-based power source.

27 Claims, 22 Drawing Figures

| $V_{CH}$ | $\overline{V_{CH}}$ | $V_{CL}$ | $V_{CH} \oplus V_{CL}$ | $V_D$ |
|---|---|---|---|---|
| 0 | 1 | 0 | 0 | $V_D > V_{HT}$ |
| 1 | 0 | 0 | 1 | $V_{LT} < V_D < V_{HT}$ |
| 1 | 0 | 1 | 0 | $V_D < V_{LT}$ |

| $A(t-1)$ | $B(t-1)$ | $A(t)$ | $B(t)$ | $\overline{CCWE}$ | $\overline{CWE}$ |
|---|---|---|---|---|---|
| 0 | 0 | 0 | 0 | 1 | 1 |
| 0 | 0 | 0 | 1 | 1 | 0 |
| 0 | 0 | 1 | 0 | 0 | 1 |
| 0 | 1 | 0 | 0 | 0 | 1 |
| 0 | 1 | 0 | 1 | 1 | 1 |
| 0 | 1 | 1 | 1 | 1 | 0 |
| 1 | 0 | 0 | 0 | 1 | 0 |
| 1 | 0 | 1 | 0 | 1 | 1 |
| 1 | 0 | 1 | 1 | 0 | 1 |
| 1 | 1 | 0 | 1 | 0 | 1 |
| 1 | 1 | 1 | 0 | 1 | 0 |
| 1 | 1 | 1 | 1 | 1 | 1 |

INCREMENTAL OPTICAL ENCODER SYSTEM FOR ABSOLUTE POSITION MEASUREMENT

BACKGROUND OF THE INVENTION

The present invention relates to electromechanical transducers, and more particularly to optical encoding devices of both linear and rotary configurations particularly adapted for providing an electrical signal output indicative of angular or linear position and/or angular or linear velocity.

Optical encoders are well known in the art and are usually classified as absolute encoders when designed to indicate position by a series of mutually unique coded output signals, or incremental encoders when capable of yielding an output signal in the form of a count or train of similar pulses.

Absolute encoders usually employ a plurality of concentric or parallel tracks each containing a number of, for example, light-opaque and transmissive elements. The tracks are typically encoded to provide a cyclic binary output, hence the number of elements doubles as one progresses from track to track. In an absolute encoder having $(n)$ tracks, the most crowded track must therefore contain $2^{(n)}$ elements. A detector is provided for reading each track. Clearly these devices are complex and expensive, especially when higher resolutions are required, and the number of tracks becomes correspondingly large.

Incremental encoders typically incorporate either a circular disc or linear strip, either of these being divided into alternative light-transmissive and opaque sectors. A variation on this basic concept of an incremental encoder and one which is well known in the art comprises a disc or strip having a plurality of tracks, each having secotrs of equivalent size, the sectors of a first track being positioned 90° out of phase relative to those of a second track. The output signals of the light detectors in such an encoder are as a result also phased 90°, i.e. in quadrature with respect to one another, and with the addition of special phase decoding circuitry well known in the art, a directional indication can be derived from these signals. Such encoders are exemplified by the devices shown in U.S. Pat. No. 3,723,748 to R. Coburn, U.S. Pat. No. 3,912,926 to C. Coulbourn, and others.

Using the foregoing means for deriving a directional indication from an incremental encoder, it is also well known to provide up-down counter means for obtaining information on absolute position. An incremental encoder, when applied in such a manner, will obviously provide a far less expensive solution than would a similarly applied $(n)$ track absolute encoder. One major deficiency, however, in using an incremental encoder combined with phase-decoding and counter circuitry to replace an absolute encoder is that of data loss upon a loss or failure of system power. A partial solution to this problem is taught by the current technology utilized in semiconductor memory systems where a rechargeable battery back-up system is provided to allow for data retention during a period of power loss or outage. Such a back-up system along with the use of a low power consumption semiconductor technology such as CMOS or I²L would produce an incremental encoder-based system with the capability of retaining the position data that was present at the time that external power was removed until that power is once again restored. In the interim period, however, no position data will be obtained since power will be removed from the incremental encoder as its power consumption cannot be tolerated without resorting to excessively large batteries mainly due to the relatively large current requirements of its light emitter(s).

It is therefore evident from the foregoing description of the prior art that heretofore, it has not been feasible to provide an absolute positioning system based on a relatively inexpensive incremental optical encoder, where the acquisition of position information will be continuous, even throughout periods of temporary power outage or removal.

BRIEF DESCRIPTION OF THE INVENTION

In accordance with the present invention, the deficiencies of the prior art are overcome by providing a system based upon an incremental optical encoder having the capability not only to retain position information during a period of power outage, but also to acquire position information during such a period.

By also providing a system whose power consumption is sufficiently small enough to allow the use of a power back-up subsystem having rechargeable batteries of a much smaller magnitude of size than would have been required by the prior art, it now becomes possible for the present invention to provide, without increasing its size beyond practical limits, an encoder housing containing the entire position encoding system including all decoding, counting, conpensating, and buffering circuitry in addition to the battery back-up sub-system inclusive of batteries.

More specifically, the invention comprises the use of a technique whereby the light emitter(s) of the encoder are pulsed or strobed, i.e. turned alternately on and off, such that the duty cycle of light emission is less, preferably far less, than 100%. If, for example, a light emitting diode is only turned on for 5 or 10% of the time, its power consumption will only be 5 or 10% of that of a light emitting diode as utilized in the prior art. In conjuction with the above, during the time period where the photodetectors would respond to these pulses of light the outputs of the photodetectors are sampled, these samplings being used to update registers which in effect become the counterparts of and are for all practical purposes equivalent to the quadrature-phased outputs belonging to the prior art so long as the frequency of these sampling pulses is sufficiently greater than four times the maximum frequency at which any one channel of the quadrature-phased encoder signals are to change for any specific application of this encoder system. It should be understood at this point that it is also well known in the art to derive signals from a pair of quadrature-phased encoder output channels whereby these signals occur at a rate equal to twice or four times (4x) the pulse rate of any one channel alone. Should a four times (4x) scheme of pulse outputs from the phase-decoding circuitry be utilized, the minimum sampling pulse rate could then be interpreted as being sufficiently greater than the maximum frequency at which these (4x) pulses will occur.

Suggested circuitry will be shown for accomplishing this basic sampling technique. The present invention will also provide a sampling circuit technique producing quadrature-phased signals whereby the electrical hysteresis essentially lost in the basic sampling approach will be re-introduced through a technique embodying voltage comparators and digital circuitry. Another object of the present invention is to provide circuitry for eliminating, during periods where external power is being applied to the system, any restrictions on the rate of acquisition of position information which might be imposed by the sampling technique. This is accomplished by turning the emitter on for a 100% duty cycle during these periods and causing the quadrature-phased outputs to be produced in a manner similar to that of the prior art until such time as external power is no longer applied to the system at which point the circuitry will revert to using the sampling technique embodied in the present invention, thereby reducing power consumption during the period of dependence on the battery back-up sub-system.

Still another object of this invention is to provide a system based upon an incremental optical encoder where in addition to the utilization of a pulsing and sampling technique to reduce power consumption, a sequential digital technique is utilized in conjunction with the sampling circuitry to directly provide decoded count pulses intended for driving the up-down counter which is the position recording and retaining element in the encoder system.

Another object of the present invention is to provide various formats for interfacing the encoder system with the external system to which it is intended to supply position information. In particular a multiplexed bus-oriented approach is disclosed which lends itself readily to interfacing with computer-type systems. Also, various methods are offered whereby the external system may initialize (preset) or re-initialize the position information contained within the encoder system. The problems of interfacing circuitry of different technologies, logic thresholds, and power supply voltages are overcome by various techniques which are also provided by the present invention.

Additionally, a method of detecting the absence of power in the external system is offered, along with various configurations for the battery back-up sub-system which provides power for the encoder system during periods when power from the external system is no longer available.

Using technologies which are currently available, the system described in the preceding paragraphs will have the capability to continue for a period of days or even weeks under its own power to acquire position information while the external system with which it interfaces is without power. As technological improvements occur in the future with respect to light emitter efficiency, photo-detector speed and sensitivity and the speed and power consumption of the analog and digital circuitry which is utilized, it may well be possible that the present invention will be able to acquire position information over a period of months while operating under its own power.

The foregoing and other features and objects of the invention will be pointed out more particularly and will become more apparent from the following more detailed description of the invention taken in conjunction with the accompanying drawings which form an integral part thereof.

DESCRIPTION OF THE PREFERRED EMBODIMENTS

Figure 1:
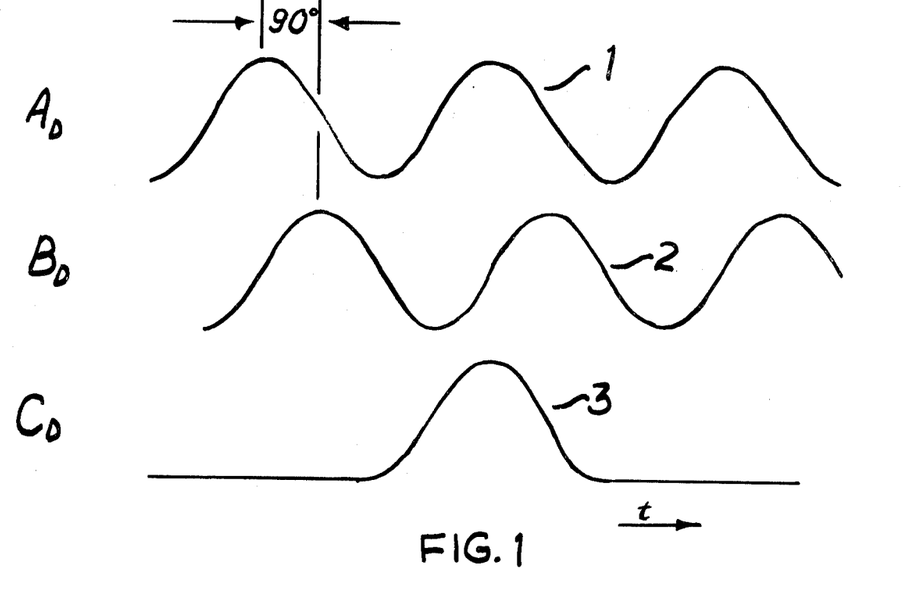
FIG. 1 is representative of the output waveforms of one type of encoder of the prior art, which are also employed in accordance with the preferred embodiment.

A graphic representation of quadrature-phased sinusoidal waveforms is shown in FIG. 1 which more specifically pertains to those belonging to a type of incremental encoder commonly utilized for low cost applications requiring relatively high resolution. Such an encoder employs a so-called Moire pattern encoding technique and typically includes in addition to the moveable disc or linear strip, a fixed member also having alternate light-transmissive and opaque sectors. As a result of this configuration, any substantial displacement of the moveable member will impart a shuttering effect to the light being transmitted between the emitter(s) and the detectors which in turn will result in sinusoidal waveforms as shown in FIG. 1. These waveforms correspond to the light detector outputs (hence the subscript D) which may or may not have been amplified by the time they are described as such in further representations of the preferred embodiments. Waveforms 1 and 2 correspond to the usual A and B channels of an incremental encoder while waveform 3 represents the index or zero-marker pulse channel which if present in a particular encoder configuration may be used as a reference by the accompanying electronics.

Figure 2:
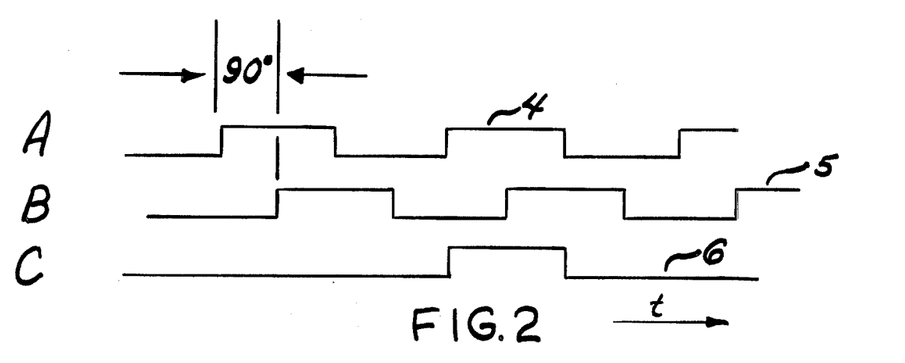
FIGS. 2 through 7 are representative of various waveforms characteristic of those employed in accordance with the preferred embodiment.

FIG. 2 depicts quadrature-phased square waveforms 4, 5, and 6 which correspond to waveforms 1, 2, and 3 of FIG. 1 respectively, and may represent either of two situations. Firstly, they may represent the outputs of an encoder as described in the preceding paragraph after the signals represented by the waveforms of FIG. 1 have been passed through some form of threshold detection circuitry, usually consisting of Schmitt-trigger type circuits. Secondly, a simple incremental encoder having relatively low resolution and not employing any of the Moire pattern techniques previously described would tend to have output waveforms similar to those of FIG. 2 and is also to be included within the scope of this invention.

In many of the graphic representations which will be referred to in subsequent paragraphs, the waveforms of FIG. 2 will be included as a reference to indicate for purposes of relative timing relationships where the quadrature outputs of an encoder of the prior art would occur when compared with those of an encoder embodying the pulsing and sampling techniques put forth by the present invention. When mention is made herein to reference output waveforms or reference channels A and B it is intended to mean the output normally produced by the optical system of conventional prior art encoders as above described.

Figure 3:
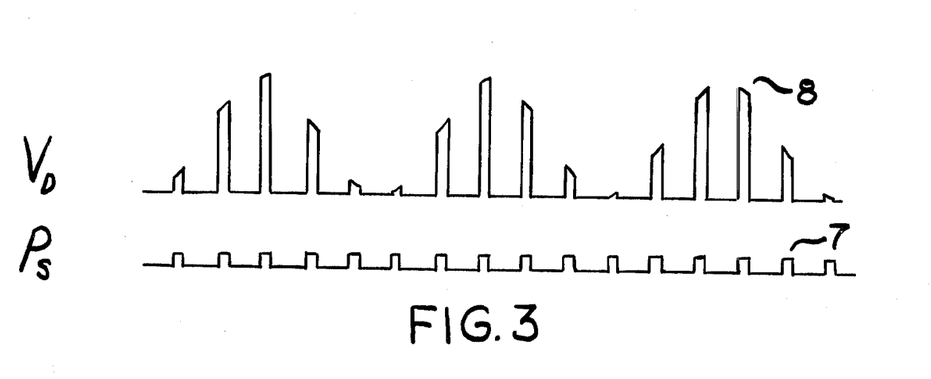

FIG. 3 showns the effect of the sampling technique of the present invention as applied to one of the sinusoidal waveforms of FIG. 1. Waveform 7 entitled $P_s$ is the sampling pulse which turns on the light emitter(s). Waveform 8 entitled $V_D$ is the output voltage of a light detector before or after amplification (if amplification is necessary) which is essentially a pulse train whose amplitude is modulated with a sine-wave.

Figure 4:
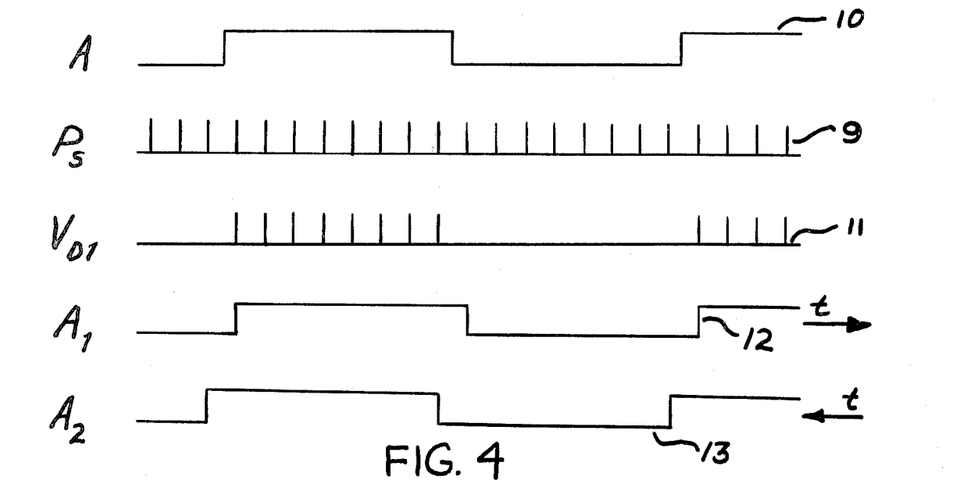
Figure 9:
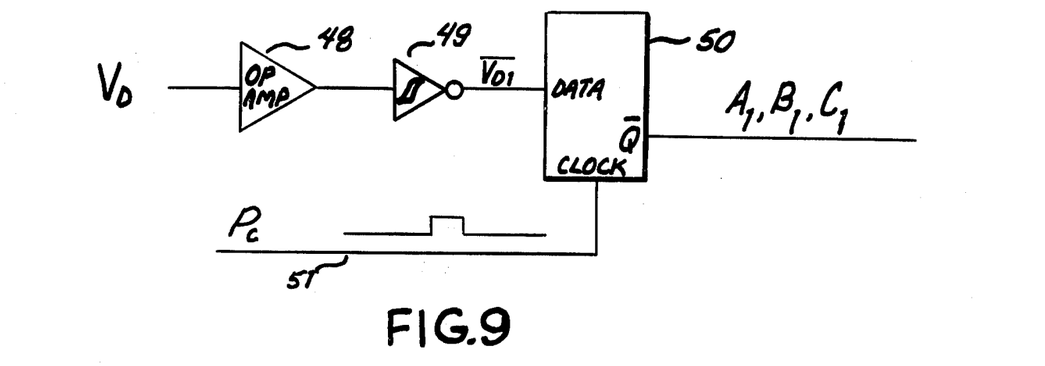
FIGS. 9, 11, 12, 15, 17, and 18 are electronic schematic diagrams illustrating more specifically circuits utilized in the digital circuit for timing, control, decoding, and counting as shown in FIG. 8.
Figure 11:
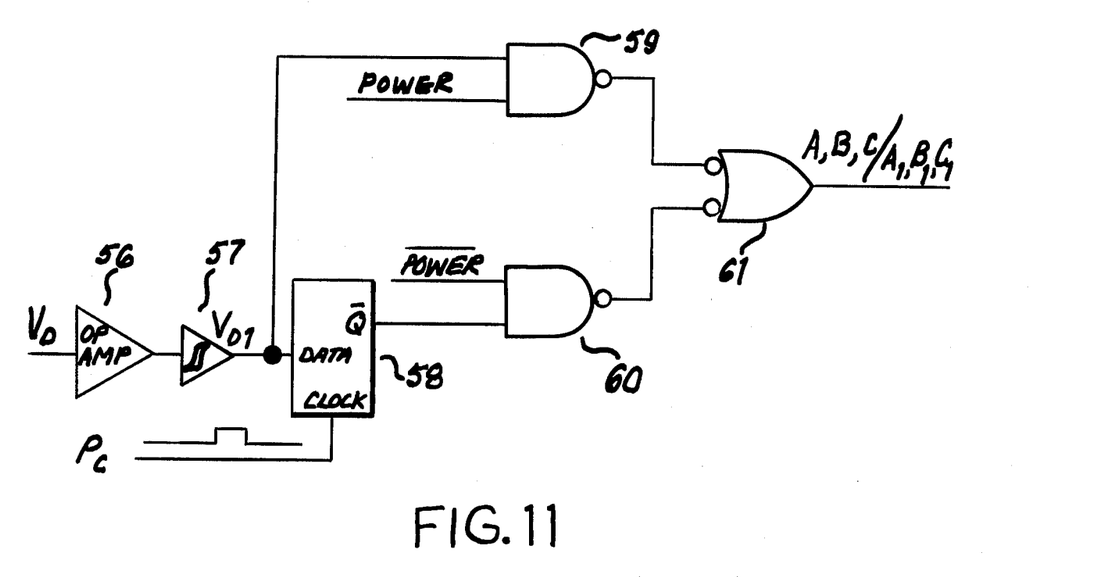

FIG. 4 illustrates the situation in accordance with the present invention where the frequency of the sampling pulses 9 is far greater than reference output waveform 10 (channel A) which is indicative that the speed of mechanical motion of the system is far lower than the maximum allowable spped. $V_{DI}$ (waveform 11) is essentially a light detector's output voltage resulting from sampling pulses 9 after passing through an optical system of an encoder and after being passed through a level detection circuit such as a Schmitt-trigger. This signal appears in the schematic representation as shown in FIGS. 9 and 11. Waveforms 12 and 13 (FIG. 4) represent the output of a register which is updated by the clock pulses which occur during the times when the photodetector would respond to light pulses. Waveforms 12 and 13 represent essentially the same signal and differ only in that they correspond to opposite directions of motion. It is apparent from this Fig. that waveforms 12 and 13 are virtually identical to waveform 10 except for differences in duration and relative positioning which will always amount to less than one period of the sampling pulse rate. What remains to be seen at this point, however, is how such a system will behave in situations where the mechanical speed input is increased to a point where the frequency of reference channels A and B approaches the frequency of the sampling pulses ($P_s$).

Figure 5:
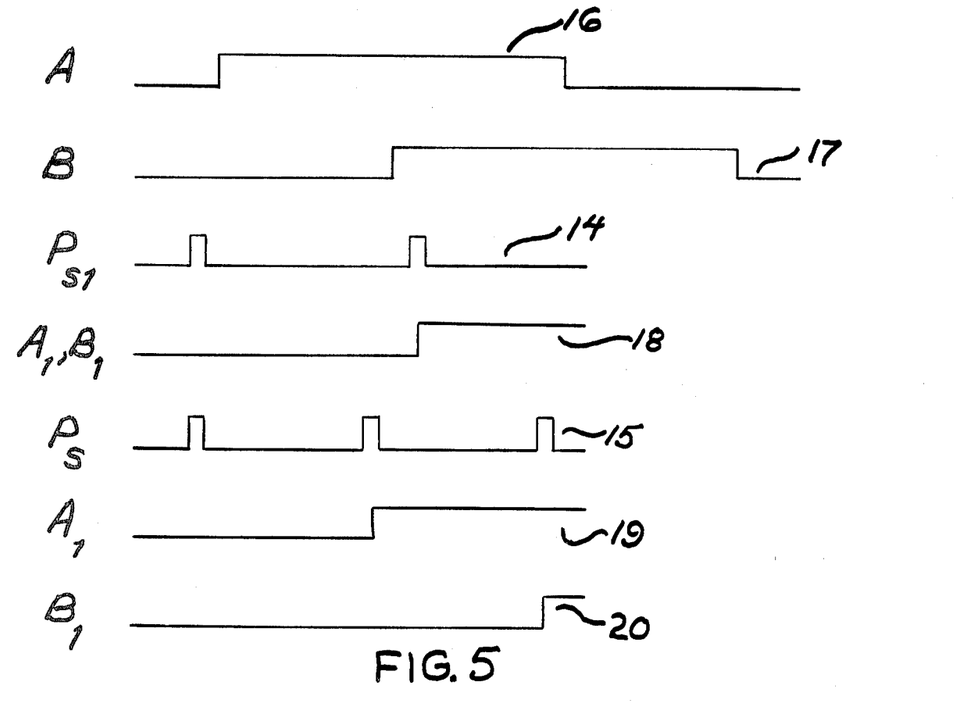

FIG. 5 illustrates the relationship of the sampling pulses 14 and 15 to the quadrature reference channels 16 and 17 (waveforms A and B) in two extreme situations where the mechanical speed of the system is at its maximum. In the first case the sampling pulses of waveform 14 occur at a frequency just less than four times that of reference channels A and B (16 and 17). Here, the clocked registers (described hereinafter with respect to FIG. 9 and subsequent Figs.) for each channel ($A_1$ and $B_1$) can have their outputs ocur ar identical times as shown by waveform 18 if all signal timing relationships are shown in FIG. 5. This is obviously not desirable since this destroys the quadrature or quasi-quadrature relationship that $A_1$ and $B_1$ must have in order for the encoder system to derive directional information from these signals.

Figure 6:
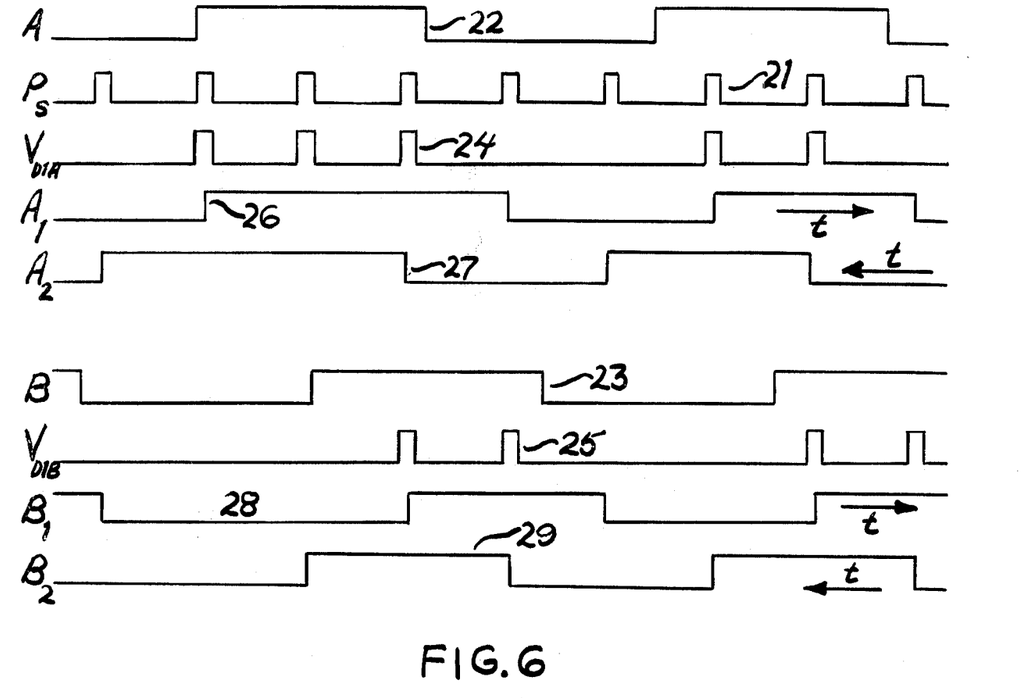

The second case illustrated by FIG. 5 is where the sampling pulses of waveform 15 occur at a frequency just greater than four times that of the reference channels. It now becomes apparent from waveforms 19 and 20 ($A_1$ and $B_1$) of FIG. 5 and the waveforms of FIG. 6, that this latter case describes, in a relative manner, the minimum frequency of sample pulses which is preferred so that for a given application waveforms $A_1$ and $B_1$ will possess all of the phase information which is necessary for extracting the directional and distance data which in the prior art has been supplied by decoding waveforms 16 and 17 (A and B). FIG. 6 essentially reiterates the relationship of FIG. 4 except that all of the sampling waveforms which are derived from both channels A and B are shown along with the relative timing relationship just described where the frequency of the sampling pulses 21 is just greater than four times the maximum frequency at which channels A and B (waveforms 22 and 23) will occur for the particular application of this encoder system. Waveforms 24 and 25 ($V_{DIA}$ and $V_{DIB}$) represent $V_{DI}$ as it applies to channels A and B respectively. Waveforms 26 and 27 ($A_1$ and $A_2$) and also 28 and 29 ($B_1$ and $B_2$) represent the outputs of sampling registers (refer to FIGS. 9-50) for channels A and B respectively where $A_1$ differs from $A_2$ and $B_1$ differs from $B_2$ only in that they correspond to different directions of motion.

It should be mentioned at this point that from the preceding descriptions it should be readily apparent that the position of the index or zero reference pulse (refer to FIGS. 1-3) can be readily obtained by similar pulsing and sampling methods.

The foregoing discussion has referred to a sampling pulse frequency which is just greater than four times the maximum output frequency of a quadrature channel which is to be allowed for in a particular application of of an encoder system as provided by the present invention. It is especially preferred that the sampling pulse frequency of the light emitter according to this invention be at least four times the maximum operational frequency for any given use of the light detectable from the optical system of the encoder employed without pulsing of the light emitter. Slightly greater than four times this frequency is even more advantageous. To clarify in more specific terms what is meant here by the term "slightly greater" the following aspects must be considered. Starting with the period corresponding to four times the maximum frequency of interest as has been described above, one should subtract the entire propagation delay of the sampling circuit from the rising edge of the photo detector output to the clocking of the registers by $P_c$ (refer to FIGS. 9-50) and also subtract the pulse width of the one shots used in the phase decoding circuitry (refer to FIGS. 19-98) is such a phase decoding scheme is to be used, a subject which will be further elaborated upon in subsequent paragraphs. The remaining period, after the above subtractions have been performed, corresponds to a frequency which serves as a good guideline for a minimum sampling pulse frequency. In general, it is relatively safe for most purposes to choose a frequency which is at least five times the maximum frequency which might occur at the quadrature encoded channel outputs (without pulsing) for the given encoder application.

Figure 7:
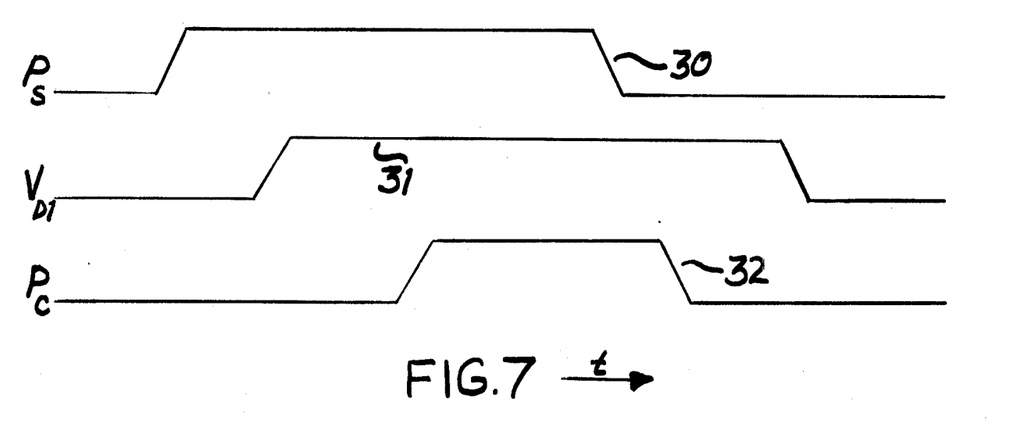

The relationship between the sampling pulse $P_s$ (FIGS. 7-30) which is used to turn on the light emitter(s) and the subsequent response 31 ($V_{DI}$) of a photo detector as shown in FIG. 7 illustrates the propagation delay involved. The amounts of relative delay and the widths of the detector outputs will vary with the type of photo detector which is utilized, e.g. photo diode, photo transistor, photovoltaic cell, etc. The clock pulse ($P_c$) which is used to update registers according to $V_{DI}$ is also shown in FIG. 7. Some of the suggested circuitry referred to in subsequent paragraphs will only require that the rising edge of 32 occur during 31 (refer to FIGS. 9, 11, and 12) while other suggested circuits will require that both the rising and falling edges of 32 occur during 31 (refer to FIGS. 15 and 18).

Figure 8:
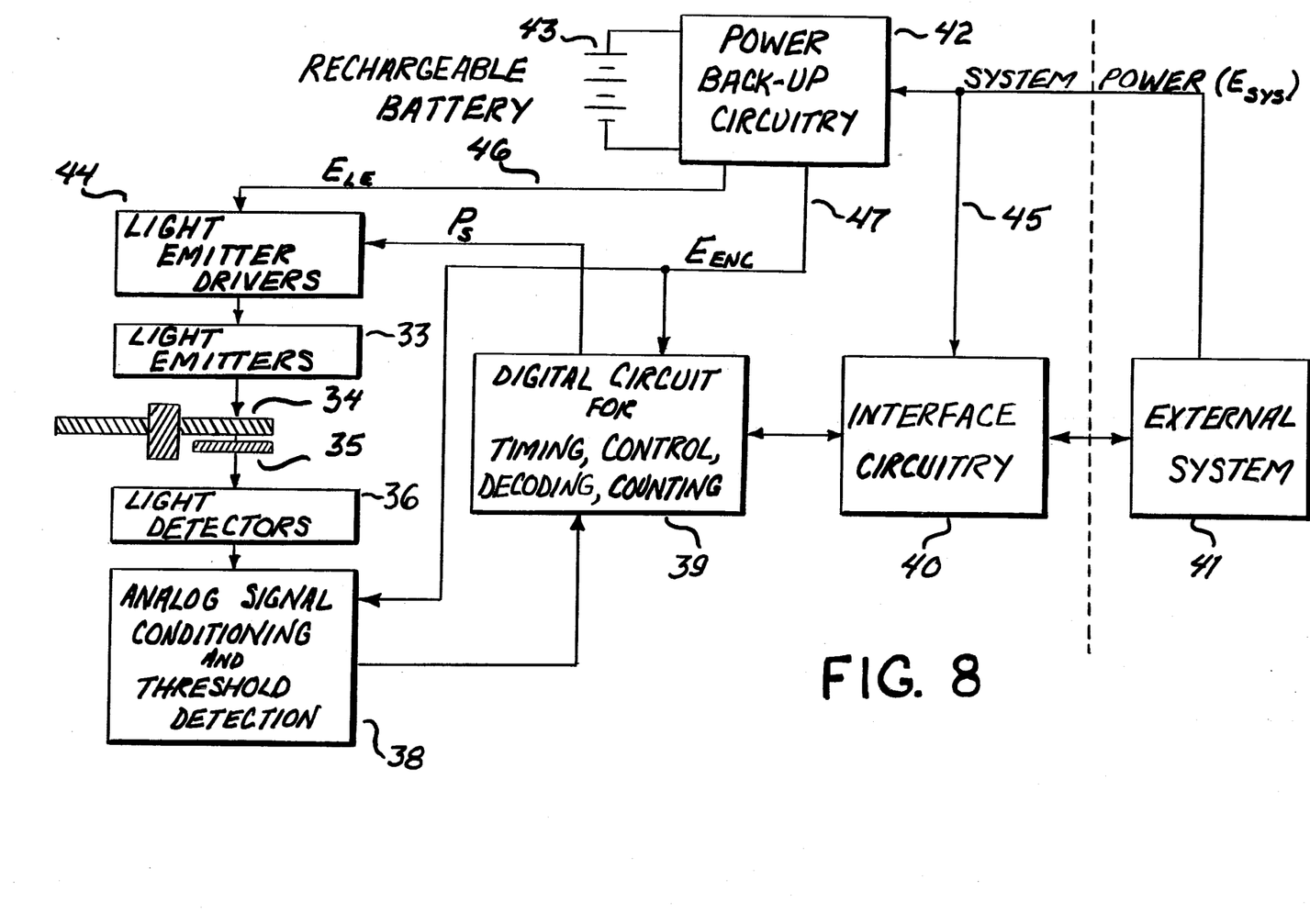
FIG. 8 is an electronic block diagram schematically illustrating a preferred system according to this invention.

A block diagram which is intended to give an overview of the preferred embodiment of this invention is shown in FIG. 8, although variations between the different suggested circuits may call for the functional breakdown to occur in a slightly different manner from that shown in FIG. 8.

Starting with the light emitter(s) 33 light passes through the encoder disc 34 and then, if used, through the masking element 35. The number of light emitters may vary with techniques employed by different manufacturers, but since a main objective is to reduce power consumption, it would seem best at this time to use a single emitter. An infra-red emitting L.E.D. is presently preferred due to its high efficiency combined with its fast turn-on and turn-off speeds. An incandescent lamp is not especially suited for the present invention due to its relatively slow speeds and high initial current draw upon turn-on. It should be pointed out here that when a L.E.D. is used at relatively high current levels as they normally are when employed in an encoder of the prior art, their expected life span drops considerably when compared to operation at lower current levels. A side effect of certain configurations of this invention is therefore to greatly extend the expected life span of the L.E.D.(s) by pulsing the emitter(s) with a relatively low duty-cycle while at the same time offering the benefits of operation at higher current levels only when they are needed. Laser diodes might also be employed as light emitter(s) in some circumstances.

The preferred component for use as a light detector 36 is a photodiode due to its fast response speed, although its output may need amplification before it becomes usable. Variations on the photodiode which may be used are the P-I-N photodiode, Shottky barrier photodiode, avalanche photodiode, and photovoltaic cell. Components which may also be utilized for this purpose are phototransistors, photoDarlingtons, and others. The minimization of delay within the light emitter, light detector, and the associated circuitry is referred to often in the descriptions of the present invention because of the basic fact that any improvements in speed with regard to the above-mentioned items will allow the light emitter(s) to be turned on for shorter lengths of time thereby reducing the average overall power consumption of the encoder system.

With regard to the light detectors, it should be mentioned here that there is a variation in encoder configuration which is well known in the art and is to be included within the scope of this invention. Such a configuration is known as a "push-pull" type of signal generation and involves the use of two light detectors and possibly two separate tracks per channel. An encoder having channels A, B, and index C would therefore have six light detectors and either three or six tracks. Each pair of photodetectors is positioned in such a way that light is passed to one photodetector while light is blocked to the other. This situation is then reversed as the disc is rotated through half a count cycle. The "push-pull" technique insures that the geometrical form of the basic electrical signal (i.e. symmetry) does not change if there is a variation in the electrical power which energizes the light source(s). Such a technique is utilized in the device as shown in U.S. Pat. No. 3,400,275 to D. H. Trump.

The circuitry for analog signal conditioning and threshold detection (37) is intended to provide a digital output indicative of the positioning of the opto-mechanical system at the time of sampling. The analog signal conditioning may perform an amplification function, either in a current or voltage mode while the threshold detection circuitry may consist of either Schmitt-triggers (FIGS. 9-49, 11-57, and 15- ) or differential comparators (FIGS. 12-64, 65, and 18-87, 88, 89, 90).

The digital control circuit 38 comprises numerous functions starting with that of system timing. The timing function starts with a reference oscillator from which $P_s$(30) and $P_c$(31) are derived through the use of one-shots or a combination of counters, flip flops, and logic gates. Also included are the phase decoding and counting functions inclusive of the preset control and preset data registers if utilized. Further details on the presently preferred configurations for various portions of 38 will be described more fully in later paragraphs. It should be mentioned here that most if not all of the functions of 38 could be performed by a microprocessor, microcomputer, or programmable calculator chip under software control. At this point in time, however, this approach is not preferred due in combination to the relatively high power consumption and relatively low speed capability of such devices.

All of the circuitry which is to remain operational during periods when external power ($E_{sys}$) is removed derives its power from $E_{enc}$ 47 which is generated by the power back-up circuitry 42 except for the light emitter 33 and driver 44 which are preferred to be powered directly by the battery ($E_{LE}$46). The back-up circuitry 42 handles the power distribution function, the sensing of power loss (FIG. 10), the trickle charging of battery 43 (FIG. 21), and the voltage step-up function (FIG. 22) if such a function is utilized to provide a voltage $E_{enc}$47 which is higher in value than the nominal battery voltage. It is preferred that the circuitry which is powered by 47 be of a low power-consuming semiconductor technology such as CMOS, Silicon-on-Sapphire (SOS) CMOS, or Integrated Injection Logic ($I^2L$).

The interface circuitry 40 is powered by $E_{sys}$45 since no interfacing capability is necessary when the external system 41 is not operational which is the case when $E_{sys}$ is removed. Various preferred interfacing configurations will be shown in FIGS. 19 and 20.

A basic circuit for registering signals derived from a photodetector at the time of sampling is shown in FIG. 9. The photodetector output voltage $V_D$ is supplied to op-amp 48 where it is amplified to be compatible with the threshold level of Schmitt-trigger 49. The output of 49 is fed to flip-flop 50 where this information, which is indicative of the present configuration of the opto-mechanical system, is used to update 50 by clocking with clock pulse $P_c$ 51 at the appropriate time. The resultant output of 50 therefore represents the state of whichever channel the circuit is being applied to so long as the sampling rate is sufficiently high enough as has been described earlier.

Since the implementation of the sampling technique may impose a limit on the rate at which changes in the positioning of the opto-mechanical system may occur for a given fixed sampling rate if the channel information at the sampling register outputs 50 is to always be valid, it may be useful for certain applications at this time to change the mode of operation of the circuitry during periods when an external power source is operationally applied to the encoder system. The need for this alternative configuration is based on the fact that most of the electro-mechanical systems to which the encoder of the present invention will be applied are capable of much faster rates of position change during periods when the main power source for that electro-mechanical system is operational than when that source is not operational. Such a power source is assumed either directly or indirectly to provide the source of external power which is received by the encoder system. It should be noted, however, that while the sampling technique may tend to impose a limitation on the capabilities of a given encoder for certain applications at the present time, future developments in light emitter, photodetector, and circuit technologies should eventually allow encoder systems to be produced which, while embodying the basic sampling techniques set forth by the present invention, will be capable of operating at all rates of change of mechanical positioning up to the maximum rate which is imposed by the limitations of the opto-mechanical system itself while still having a low enough power consumption to be practical for absolute position encoding in most applications.

Figure 10:
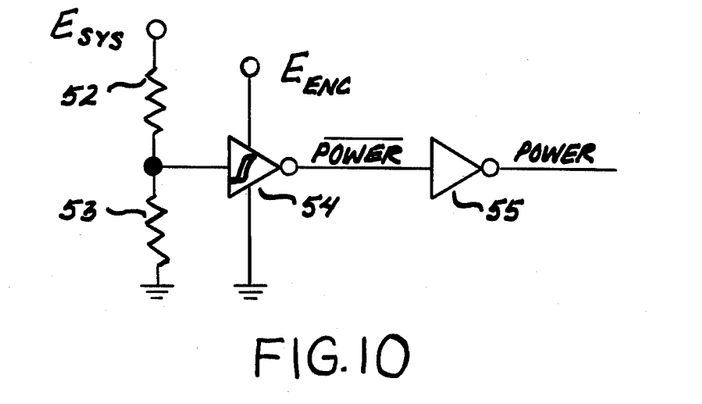
FIGS. 10, 21, and 22 are electronic schematic diagrams illustrating more specifically circuits utilized in the power back-up circuitry as shown in FIG. 8.

A circuit technique for detecting the failure, removal, or non-operational state of the external power source is shown in FIG. 10. A voltage divider consisting of resistors 52 and 53 receives power from $E_{sys}$ 45, the center point of this divider being connected to Schmitt-trigger 54 which is powered by $E_{enc}$ 47. When the external power source becomes non-operational, the output of 54 entitled "POWER" will go "high" causing the output of inverter 55 entitled "POWER" to go low. These logic signals which represent the state of the external power source will be subsequently shown in various preferred circuit configurations where they will control the change of mode which was described in the preceding paragraph.

FIG. 11 shows a circuit similar to that of FIG. 9 except that the change of mode feature under control of the "POWER" signal has been added. Op-amp 56, Schmitt-trigger 57, and flip-flop 58 operate in a manner similar to those of FIG. 9. Nand gates 59 and 60 have been added such that when "POWER" is "low", the output of Nand gate 61 is equivalent to that of flip-flop 50 of FIG. 9. When "POWER" is "high", however, flip-flop 58 is by-passed thereby disabling the effect of the sampling circuitry and producing signals at the output of 61 which are derived directly and continuously from the photo detectors and are in fact equivalent to those of a channel (A, B, or C) of an incremental encoder of the prior art. To allow such operation to occur, the control of the light emitter(s) must be such that when "POWER" goes to the "high" state the emitter(s) is(are) turned on continuously rather than being turned on only during the pulse duration of $P_s$ (FIGS. 7-30).

In most incremental optical encoders of the prior art, the outputs of the light detectors are amplified and then fed to Schmitt-triggers which perform the threshold detection function. These same Schmitt-triggers simultaneously perform another very important function. The hysteresis which has been designed into most of the Schmitt-triggers which are utilized in encoders ensures that if the encoder is mechanically stopped such that the input to a Schmitt-trigger is at the threshold level, the Schmitt-trigger output will not oscillate. Such an oscillation would cause alternate "up" and "down" counts to be applied to the counter in a position encoding system with two quadrature phased channels. In a single channel encoder system intended to measure only velocity such oscillations would cause erroneous data to be taken. Another situation where hysteresis is important occurs when the encoder is stopped at or is passing through a position where the input to a Schmitt-trigger is at the threshold level and there is mechanical vibration present in the encoder's operational environment. This vibration can also cause oscillations about the threshold level thereby introducing extraneous signals into the encoder system unless hysteresis is present in the signal conditioning circuitry to prevent or at least minimize such occurences.

Figure 15:
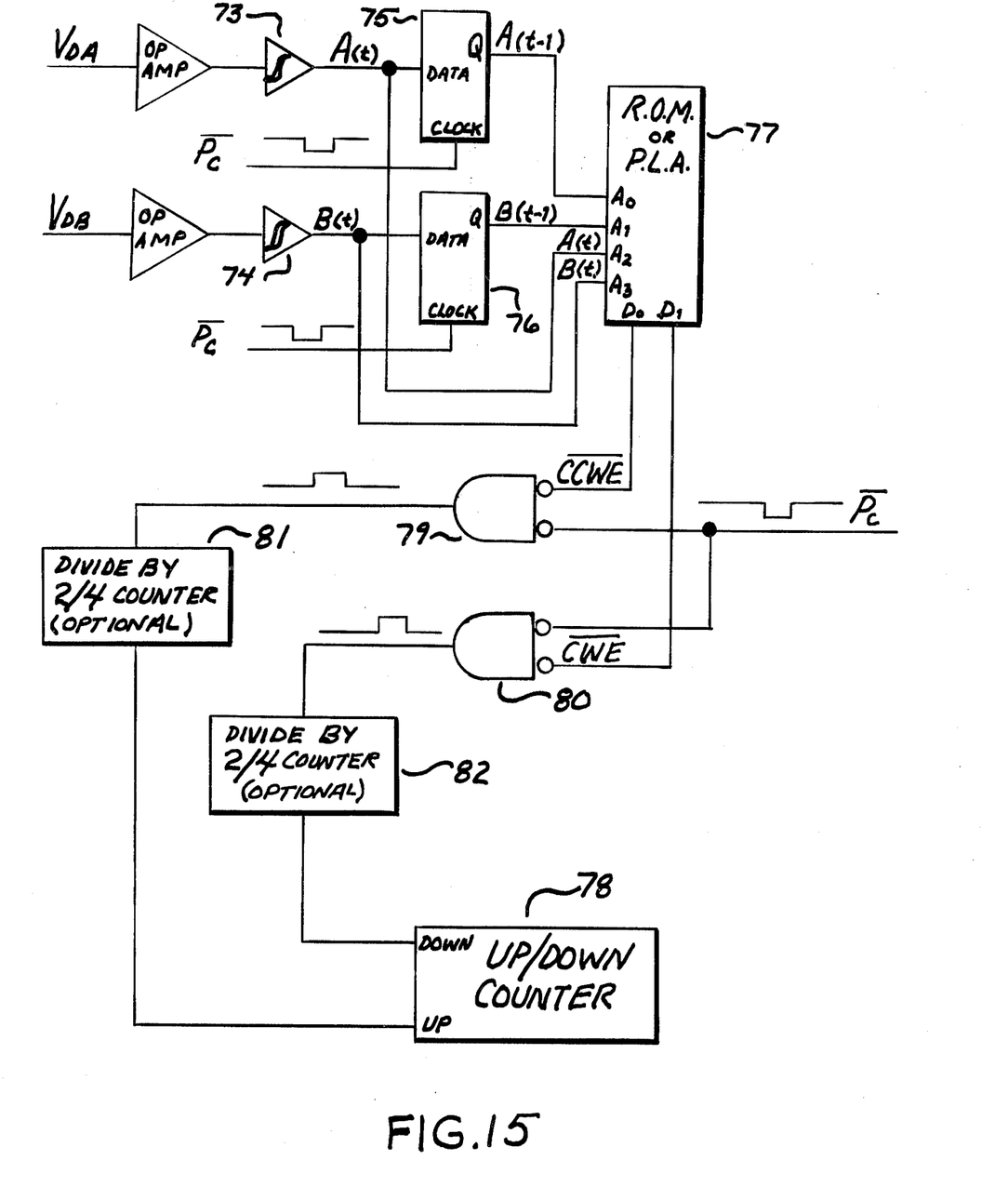

Hysteresis itself is a phenomenon which relies on information from a previous time period to influence an event which occurs in the present. It therefore follows that the circuits shown in FIGS. 9, 11, and 15, while utilizing Schmitt-triggers for threshold detection, do not utilize the hysteresis which is incorporated into these Schmitt-triggers except for the circuit of FIG. 11 when "POWER" is "high". Except for this special case concerning FIG. 11, the sequence of operation of the circuits shown in these three figures defeats the hysteresis of the Schmitt-triggers by the fact that the detector voltage $V_D$ 8 is at zero unless the detector is responding to pulses of light 7 from the light emitter (FIG. 3). The input voltage range of the Schmitt-triggers within which the hysteresis acts to produce a "dead band" is therefore constantly traversed by a photodetector voltage which might have stayed within or about this voltage range if the circuit configuration of the prior art were utilized. In a situation where hysteresis is desired, e.g. the encoder is mechanically stopped at a point where the input voltage to a Schmitt-trigger is at or near the threshold voltage during periods where the light emitter is in the "on" state, the hysteresis within the Schmitt-triggers would therefore not be utilized in circuits as shown in FIGS. 9, 11, and 15.

Figure 12:
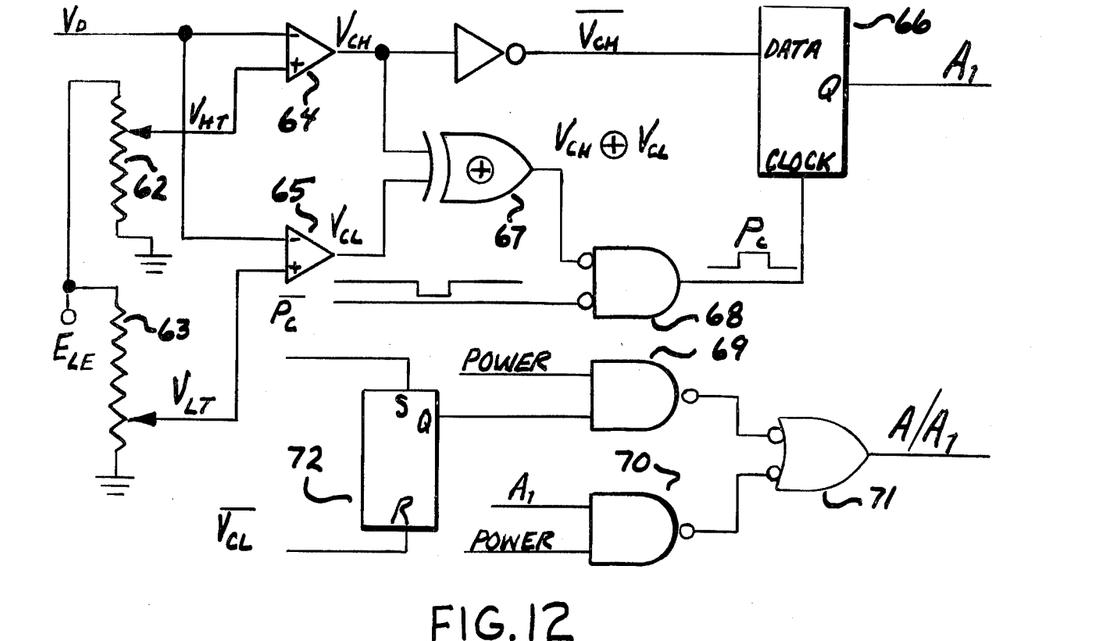

The sampling technique will, however, limit the rate of occurence of any erroneous signals resulting from mechanical noise or Schmitt-trigger oscillation to that of the sampling rate itself which for many applications may be sufficient. For those applications where this is not sufficient, an alternative approach is shown in FIG. 12 which re-inserts electrical hysteresis into the encoder system through a combination of analog and digital circuit techniques. Potentiometers 62 and 63 provide the upper and lower limits, respectively, of the threshold voltage range which will correspond to that input voltage range of an analog type Schmitt-trigger which constitutes the hysteresis "dead band". These two threshold voltages $V_{HT}$ and $V_{LT}$ are then applied to differential comparators 64 and 65 respectively. The signal $V_D$ which comprises either a voltage or a current representative of the output level of a photodetector is also applied to 64 and 65. The output of either comparator $V_{CH}$ or $V_{CL}$ may be used to update flip-flop 66 in order to register the appropriate state at the output of a given encoder channel ($A_1$ is shown). $V_{CH}$ has been used in FIG. 12 for this purpose, with the hysteresis being introduced by the fact that signal ($V_{CH} \oplus V_{CL}$), the output of exclusive-or gate 67, will be "high" thereby disabling gate 68 and with it clock pulse $P_c$ during sampling periods when the photodetector output signal $V_D$ is between the respective signal thresholds, $V_{HT}$ and $V_{LT}$. It is preferred that potentiometers 62 and 63 derive their power from the source which supplies the power for the light emitter(s) $E_{LE}$. This will help compensate for any drop in light output level from the light emitter(s) due to a corresponding drop in battery voltage during periods when an external power source is not operational. This is accomplished by correspondingly lowering each threshold level which is applied to differential comparators 64 and 65. An additional feature which is incorporated into the circuit shown in FIG. 12 allows a disabling of the photodetector sampling function when "POWER" is high and a switchover, by way of gates 69, 70, 71 to circuitry (flip-flop 72) which generates a signal which is continuously and directly derived from the photodetector output. Operation in this manner is in conjunction with the light emitter being continuously in the "on" state when "POWER" is "high", and is similar in principle to the change of mode feature as incorporated into the circuitry as shown in FIG. 11.

Figure 13:
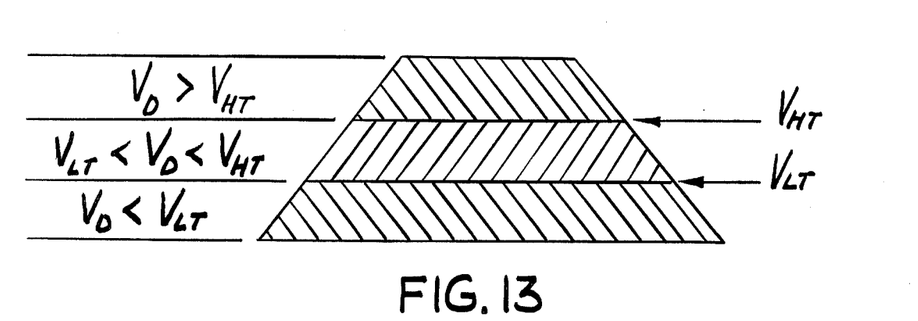
FIG. 13 is a graphic representation of voltage thresholds in accordance with the schematics shown in FIGS. 12 and 18.
Figure 14:
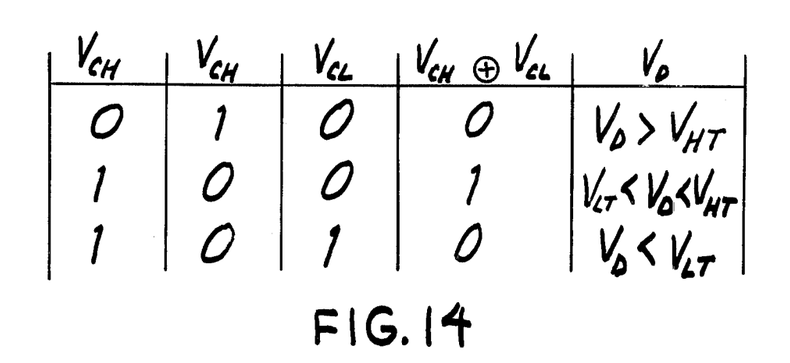
FIG. 14 is a tabular representation of logic conditions and voltage thresholds in accordance with the schematic shown in FIG. 12.

FIG. 13 is a graphic representation of a photodetector output signal $V_D$ in relation to the upper threshold level $V_{HT}$ and the lower threshold level $V_{LT}$, as depicted in FIG. 12. The tabular representation shown in FIG. 14 indicates the various combinations of logic states which will occur for the signals within the circuit as shown in FIG. 12 as these signals respond to the relationship between $V_D$ and the upper and lower threshold levels as shown in FIG. 13.

Figure 16:
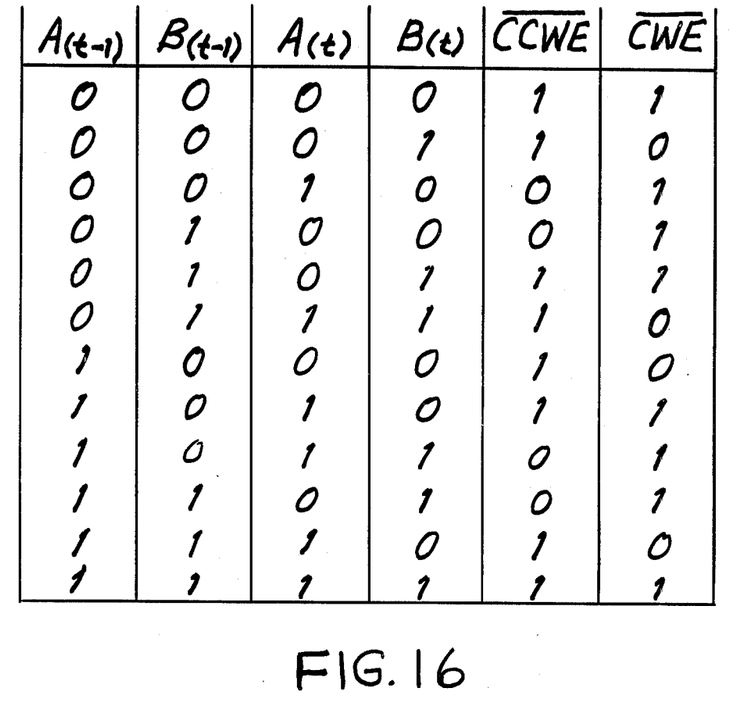
FIG. 16 is a tabular representation of logic conditions in accordance with the schematic shown in FIG. 15.

FIGS. 9, 11, and 12 provide output signals suitable for being applied to that phase decoding circuitry which is well known in the art and relies on the use of either analog (monostable) one-shots or gate-delay (digital) one-shots in conjunction with logic and flip-flops to achieve the quadrature phase decoding function. FIG. 15 provides a method of phase decoding which is instead purely digital, integrating this function with that of the sampling circuitry to provide a circuit with a relatively small component count. Schmitt-triggers 73 and 74 convert the analog signals which are derived from the photodetectors of channels A and B into digital signals in a manner similar to that shown in previous figures. During any sampling pulse $P_s$, the signals applied to the data inputs of flip-flops 75 and 76, ($A_{(t)}$ and $B_{(t)}$), represent the current state of positioning of the opto-mechanical system while the outputs of 75 and 76 ($A_{(t-1)}$ and $B_{(t-1)}$) represent the positioning of the opto-mechanical system during the previous sampling pulse. These four signals are then compared in static memory 77 which may comprise a Read-Only-Memory (R.O.M.) or a Programmable Logic Array (P.L.A.). This comparison is performed in accordance with the tabular representation of logic states as shown in FIG. 16 where two signals are produced which are used to enable the incrementing ($\overline{CCWE}$) or decrementing ($\overline{CWE}$) of up/down counter 78 by way of gates 79 and 80 where these signals are combined with the clock pulse $P_c$. The comparison between the current and prior signals is valid throughout the duration of $P_c$ providing a substantial pulse width to the up/down counter, with flip-flops 75 and 76 being updated with current information when they are clocked at the trailing edge of $P_c$. As shown in FIG. 15, and also in FIG. 18, the opto-mechanical system would be a rotary system, although this same circuitry is equally applicable to a linear system. These two figures also show counter-clockwise (CCW) movement as the direction which causes incrementing of the up/down counter which also corresponds to a phasing configuration for the signals shown in FIG. 16 such that the signal of channel A leads that of channel B. The table of FIG. 16 does not account for all of the possible permutations of the inputs applied to static memory 77 as only those conditions which will occur during normal operation of the encoder system are shown. When the opto-mechanical system within the encoder is displaced, a signal will occur at the output of either gate 79 or gate 80 with a pulse rate equal to four times (4×) the pulse rate of either channel A or B alone. Optional divide-by-two or divide-by-four counters (81 and 82) are offered should the particular encoder application require a reduction in the count rate being applied to the up/down counter from a (4×) rate to either a (2×) or (1×) rate.

Figure 17:
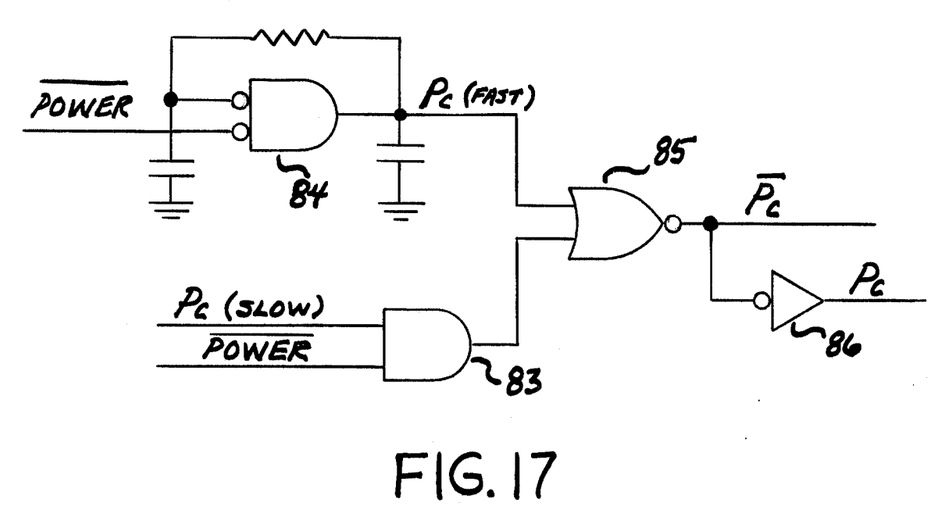
Figure 18:
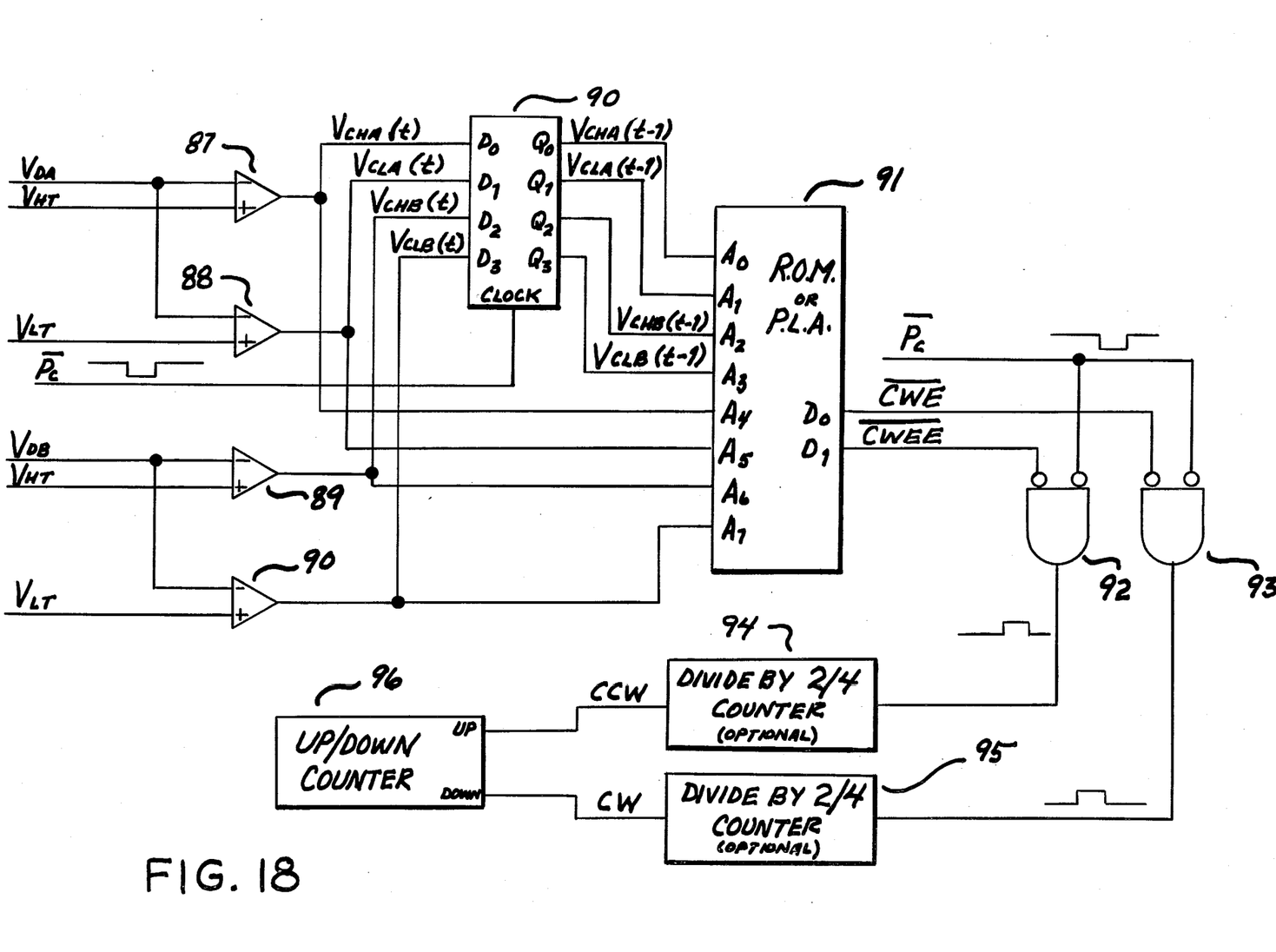

The circuit shown in FIG. 17 may be employed in conjunction with those shown in FIGS. 15 and 18 to provide the change of mode feature under control of the "POWER" signal as described earlier with respect to FIGS. 11 and 12, while at the same time providing the method of digital phase decoding which has just been described with respect to FIG. 15. The clock pulse (FIGS. 7-32) which has a relatively low duty cycle and is normally used to sample the photodetector outputs is applied to gate 83 where it is allowed to pass through when "POWER" is "low". When power is "high", the oscillator which is constructed around gate 84 is activated and its output is allowed to propagate to the output of gate 85 ($P_c$) and inverter 86 ($\overline{P_c}$). These signals then become the clock pulses for the circuits of FIGS. 15 and 18 where the sampling rate during periods when an external power source is operational can be set to a rate which is well above the limitations of the opto-mechanical system itself by choosing a high enough frequency for the oscillator which is constructed around 84 of FIG. 17.

The circuit shown in FIG. 18 utilizes a combination of features which have been described with respect to FIGS. 12 through 17 to provide a circuit which has hysteresis, digital phase decoding, and a change of mode feature which is dependent on the state of an external power source. Comparators 87 through 90 perform in a manner similar to 64 and 65 of FIG. 12 to provide hysteresis while register 90, gates 92 and 93, optional dividers 94 and 85 and up/down counter 96 perform in a manner similar to 75 and 76, 79 and 80, 81 and 82, and 78 respectively of FIG. 15 to provide the digital phase decoding function. Static memory 91 contains a combination of the information which has been presented in the tables of FIGS. 14 and 16, thereby providing the decision-making element for both the hysteresis and phase decoding functions.

Figure 19:
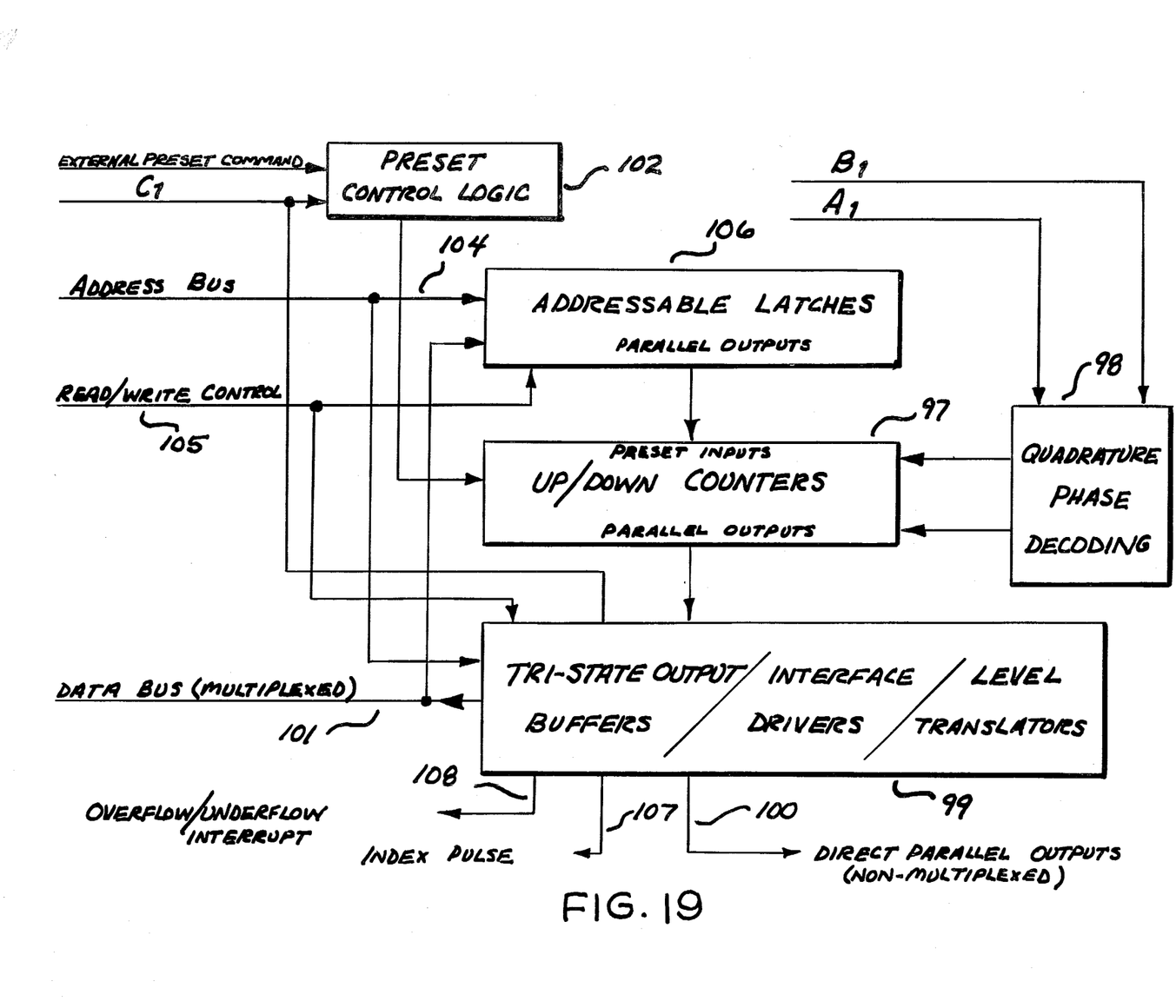
FIG. 19 is an electronic block diagram schematically illustrating more specifically the elements of 39 and 40 of FIG. 8.

Some interfacing considerations for the encoder system of the present invention are illustrated by the block diagram shown in FIG. 19. Up/down counter 97 is responsive to signals from phase decoding circuitry 98 and in turn must interface with the external system (FIGS. 8-41) to which the encoder is supplying position information. This information reaches the external system by passing through 99 which contains the logic level translators (if required) and line drivers (if required) to properly interface the encoder in a given application. Element 99 also contains buffers with tri-state outputs which are the preferred components to be used at the interface between the circuitry powered by $E_{enc}$ and that powered by $E_{sys}$. These buffers would have $E_{enc}$ for their power supply and would be placed in the third state (high impedance output) when "POWER" is "low" to prevent their driving "dead" circuitry. The position information can be supplied to the external system in a parallel format 100 or can be multiplexed onto a data bus 101. This same data bus, if made bi-directional, can also be used by the external system to provide preset information to the encoder system. Providing such information is essential to the encoder's operation since at some point in time the position information in the up/down counter must be initialized to correspond with the positioning of whatever mechanical apparatus the encoder is being applied to. Provision may also be included for re-initializing the counter at various times during the encoder's operation although the original initialization should suffice as long as the external power source is not removed for a long enough period to cause excessive drain on the battery back-up system (FIGS. 8-42).

It may also be desired for certain applications to preset the encoder each time the Index Pulse (channel C) occurs or to synchronize the Index Pulse with an external preset command in order to derive the preset signal which is applied to the up/down counter. These functions, if included, are performed by 102 of FIG. 19.

The reading of position information by the external system through data bus 101 and the writing of preset information to the encoder also through 101 is performed by the external system's utilization of address bus 104 and read/write control 105. Such a configuration is particularly useful should the external system have a computer-type architecture. The preset information may be loaded directly into the up/down counter or may be stored in optional data latches 106 from where it will be transferred to the up/down counter under control of the preset control logic 102. In addition to supplying the preset information in the above described manners, this information may be stored in hardware form within the encoder by using either miniature switches, hard-wired jumpers, or a programmable Read-Only-Memory, the information then being transferred to the up/down counter under control of 102.

The index pulse 107 may be supplied to the external system as well as an indication 108 of up/down counter overflow or underflow which may perform an interrupt function with respect to the external system.

Figure 20:
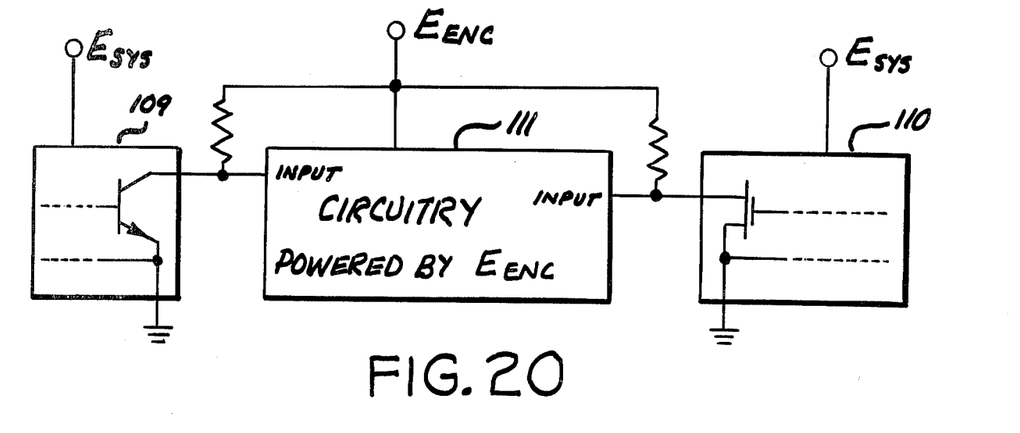
FIG. 20 is an electronic schematic diagram illustrating more specifically circuits utilized in 40 the interface circuitry as shown in FIG. 8.

Suggested interfacing components for signals which originate in the external system and are being applied to the encoder circuitry 111 which is powered by $E_{enc}$ are shown in FIG. 20. By utilizing an open-collector configuration 109 or an open-drain configuration 110, the problems which might occur if $E_{sys}$ is greater than $E_{enc}$ or vice-versa can be avoided.

Figure 21:
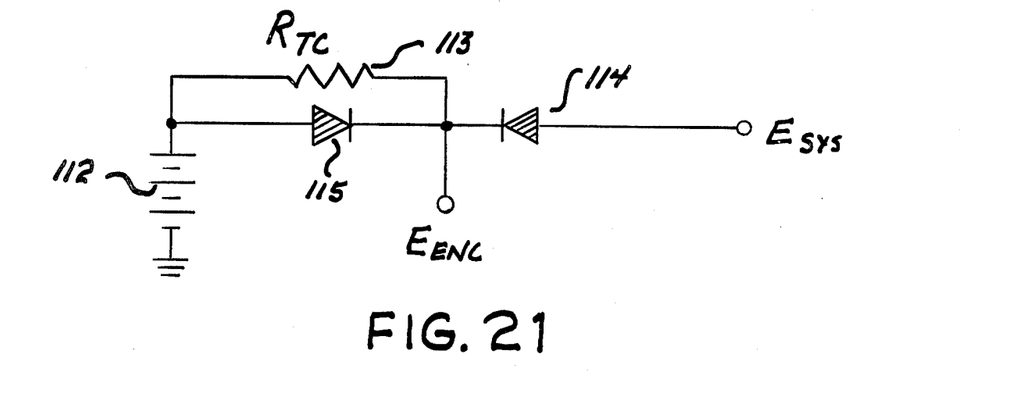

A basic power source changeover circuit which constitutes a portion of the power back-up circuitry 42 of FIG. 8 is shown in FIG. 21. Rechargeable battery 112 which is preferred to be either a nickel-cadmium or lead-calcium type is normally trickle-charged by way of resistor $R_{TC}$113 and diode 114 when $E_{sys}$ is operationally applied. When $E_{sys}$ becomes non-operational, diode 114 will become reverse-biased and diode 115, which had been reverse-biased when $E_{sys}$ was greater than the battery voltage, will become forward-biased allowing the battery to supply current to the encoder by way of $E_{enc}$.

Figure 22:
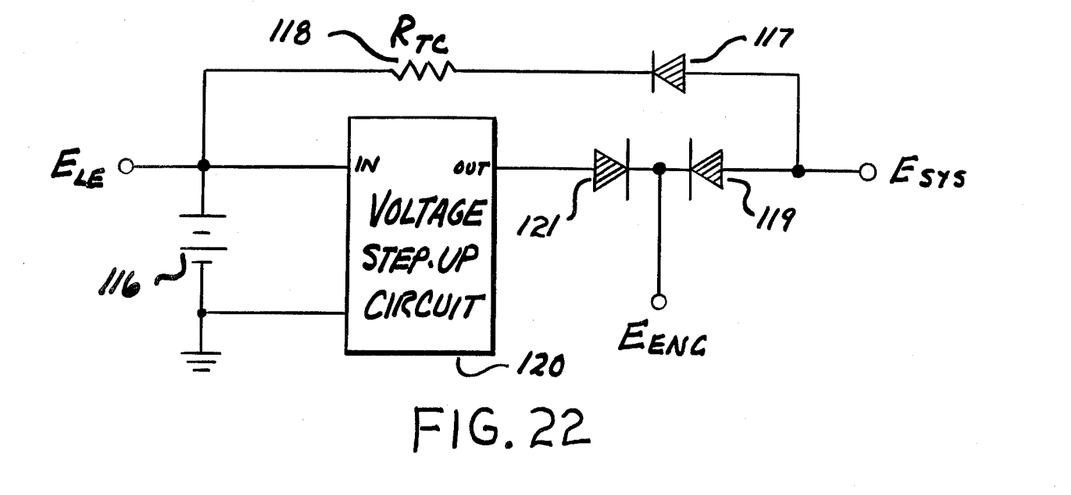

FIG. 22 describes a more elaborate variation on the basic power source changeover circuit which was shown in FIG. 21. Battery 116 is again trickle-charged by $E_{sys}$ through a diode 117 and a series resistor $R_{TC}$118. $E_{enc}$ is derived either from $E_{sys}$ by way of diode 119 when $E_{sys}$ is operational or from the voltage step-up circuit 120 by way of diode 121 when $E_{sys}$ is not operational. In this configuration it is preferred to derive the power ($E_{LE}$) which drives the light emitters directly from the battery to avoid wasting the battery's energy during periods where the encoder circuitry is relying on the battery for power. Such a rechargeable battery might consist of two nickel-cadmium cells in series having an overall nominal voltage of 2.4 volts. The voltage step-up circuit 120 is necessary in this instance as some types of circuitry (e.g. normal CMOS) require more than 3 volts for their operation. The trickle-charge series resistor $R_{TC}$118 of FIG. 22 should be chosen such that when $E_{sys}$ is operational the resistor will allow a total current to flow which is equal to the sum of the charging current of battery 116 and the current required by the light emitter(s).

Resort may be had to such further modifications and equivalents as fall within the spirit of the invention and the scope of the appended claims.

What is claimed is:

1. An encoder provided with an opto-mechanical system having alternate light transmittable and opaque sectors, a light emitter and at least two photodetectors for producing periodic electronic signals from light transmitted thereby comprising:
    an optical system producing at least two electrical signals of different phase representing different directions of motion mechanically transmitted to the encoder;
    means for pulsing the light emmitter to on-off states to reduce the power requirements of the light emitter, said pulsing being at a frequency which is at least four times the maximum operational frequency for an intended use of the light detectable from the optical system without pulsing of the light emitter;
    means for sampling the output of the photodetector during emission of pulses of light from the light emitter;
    means for registering signals from said sampling means and for emitting signals comparable to those which otherwise would be generated by said light emitter without pulsing of same; (and)
    phase decoding means providing electrical signals suitable for incrementing and decrementing up-/down counter means in accordance with the direction and rate of motion of said opto-mechanical system;
    up/down counter means responsive to the signals generated by said phase decoding means;
    means for setting said up/down counter means to a predetermined count in response to a preset command signal; and
    battery means providing a power source for said light emitter and the aforesaid means.

2. An encoder in accordance with claim 1 wherein the light emitter is a light emitting diode.

3. An encoder in accordance with claim 1 wherein the light emitter is a light emitting diode whose output is primarily in the infra-red region of the light spectrum.

4. An encoder in accordance with claim 1 wherein the light emitter is a laser diode.

5. An encoder in accordance with claim 1 wherein the photodetectors are phototransistors.

6. An encoder in accordance with claim 1 wherein the photodetectors are photodiodes.

7. An encoder in accordance with claim 1 wherein the photodetectors are P-I-N photodiodes.

8. An encoder in accordance with claim 1 wherein the photodetectors are Shottky barrier photodiodes.

9. An encoder in accordance with claim 1 wherein the photodetectors are Avalanche photodiodes.

10. An encoder in accordance with claim 1 wherein the photodetectors are photovoltaic cells.

11. An encoder in accordance with claim 1 wherein the optomechanical system is a rotary system.

12. An encoder in accordance with claim 1 wherein the optomechanical system is a linear system.

13. An encoder in accordance with claim 1 wherein said phase decoding and up/down counter means comprise low power-consuming CMOS circuitry.

14. An encoder in accordance with claim 1 wherein said phase decoding and up/down counter means comprise low power-consuming Silicon-on-Sapphire (SOS) CMOS circuitry.

15. An encoder in accordance with claim 1 wherein said phase decoding and up/down counter means comprise low power-consuming Integrated Injection Logic ($I^2L$) circuitry.

16. An encoder in accordance with claim 1 wherein each channel of the opto-mechanical system comprises two photodetectors, said photodetectors being connected in a push-pull configuration.

17. An encoder in accordance with claim 1 wherein said optomechanical system employs a Moire pattern technique.

18. An encoder in accordance with claim 1 wherein a third signal representing an index (zero-reference) pulse is produced through like sampling means, the width of said index pulse being equal to one-half the period of one of the two phased signals, means also provided for deriving the preset means for the up/down counter from a simultaneous occurence of said index pulse and an externally applied preset command pulse.

19. An encoder in accordance with claim 1 wherein the photodetector outputs are fed to threshold detection means which comprise Schmitt-trigger type circuits.

20. An encoder in accordance with claim 1 wherein each photodetector is fed to at least two threshold detection means having different threshold levels which comprise differential comparators, digital logic means also being provided responsive to the outputs of said differential comparators such that hysteresis is introduced into the electro-mechanical system.

21. An encoder in accordance with claim 1 wherein said phase decoding means comprises static memory means for comparing the registered signals resulting from one sampling pulse with those resulting from the previous sampling pulse, digital logic means providing appropriate signals for incrementing or decrementing said up/down counter in response to said comparison.

22. An encoder in accordance with claim 1 wherein the digital functions within the encoder including any of the functions required for light emitter timing and control, light detector sampling, decoding of phased signals, up/down counting, count presetting, and interface timing and control comprise sequential digital means derived from any of microprocessor, microcomputer, and programmable calculator chip systems.

23. An encoder in accordance with claim 1 wherein said battery means comprises a nickel-cadmium battery.

24. An encoder in accordance with claim 1 wherein said battery means comprises a lead-calcium battery.

25. An encoder in accordance with claim 1 wherein an external power source is also provided such that the encoder derives its power from said external source when said power source is operatively applied, and means are also provided for deriving encoder power from said battery means when said external power source is not so applied.

26. An encoder in accordance with claim 1 also comprising: means for applying an external power source to the encoder;
   means for placing the light emitter continuously in the "on" state during periods when an external power source is operationally applied to the encoder; and
   means for increasing the rate of photodetector sampling during said periods of time when an external power source is so applied.

27. An encoder in accordance with claim 1 also comprising:
   means for applying an external power source to the encoder;
   means for placing the light emitter continuously in the "on" state during periods when an external power source is operationally applied; and
   means for disabling said photodetector sampling means and for providing phased signals derived directly and continuously from said photodetectors during periods when an external power source is so applied.

* * * * *